Oct. 4, 1955 W. B. DEAN 2,719,489
ROOF AND RELATED STRUCTURAL ARRANGEMENTS OF VEHICLES
Original Filed March 30, 1950 5 Sheets-Sheet 1
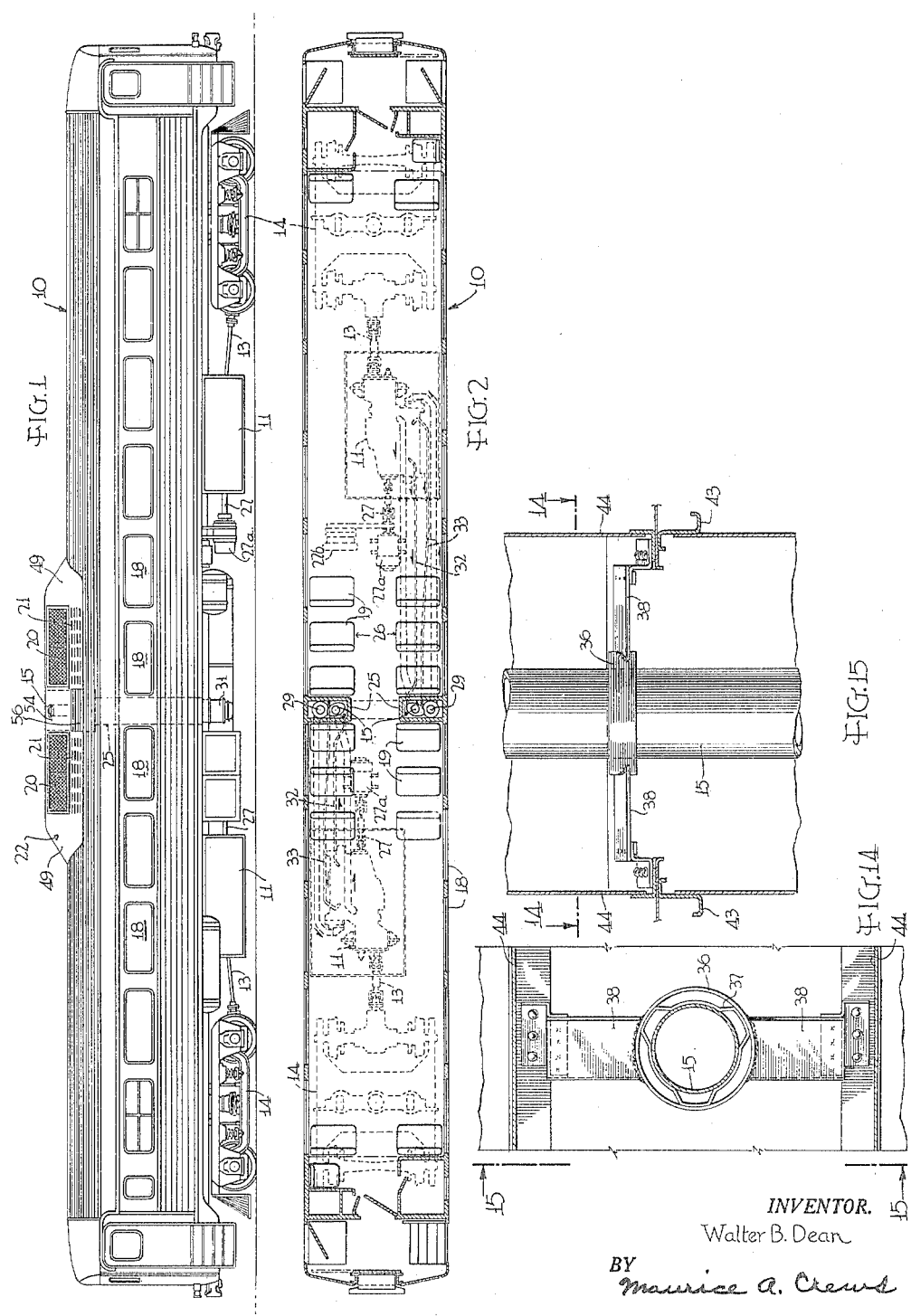
INVENTOR.
Walter B. Dean
BY
Maurice A. Crews
ATTORNEY

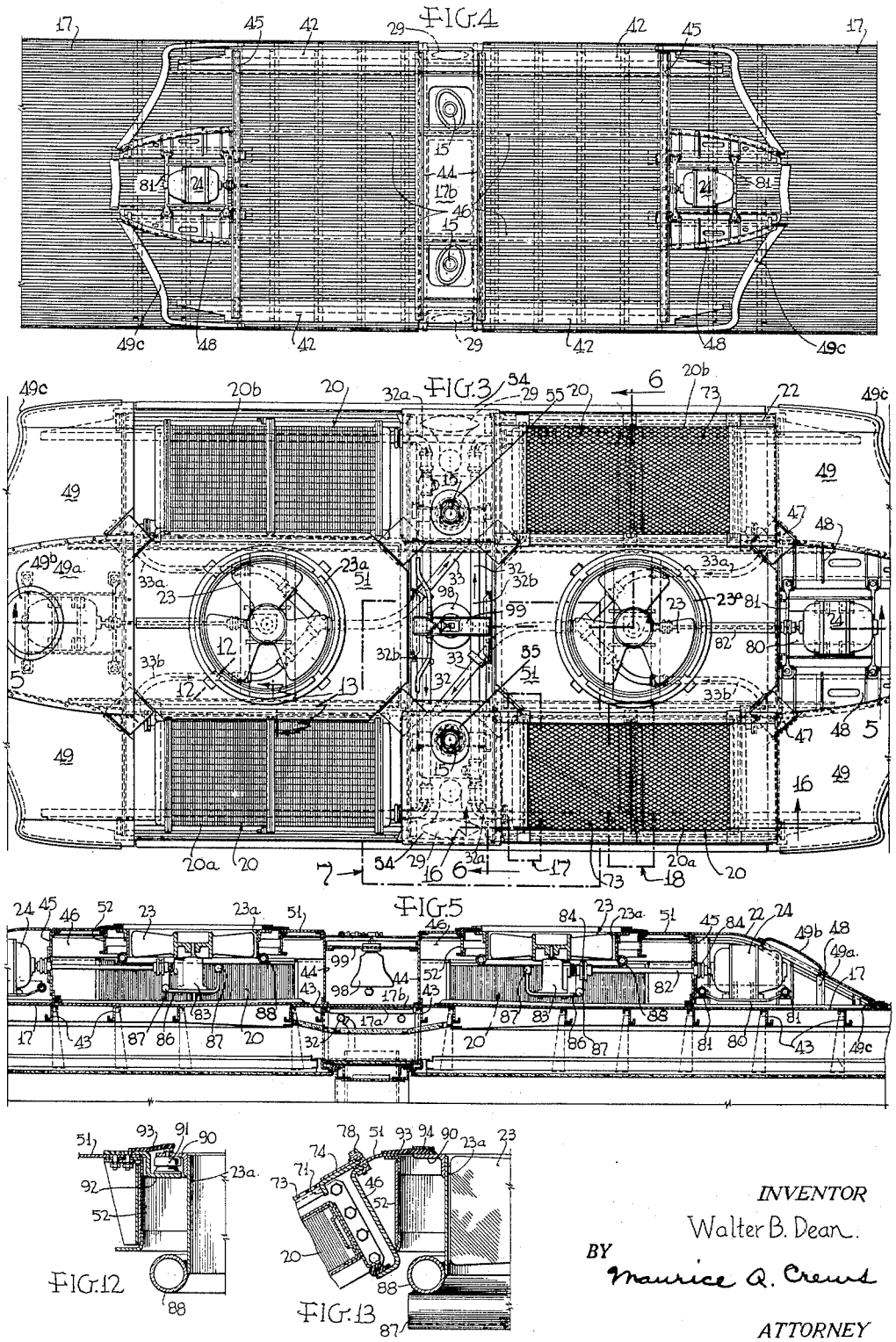

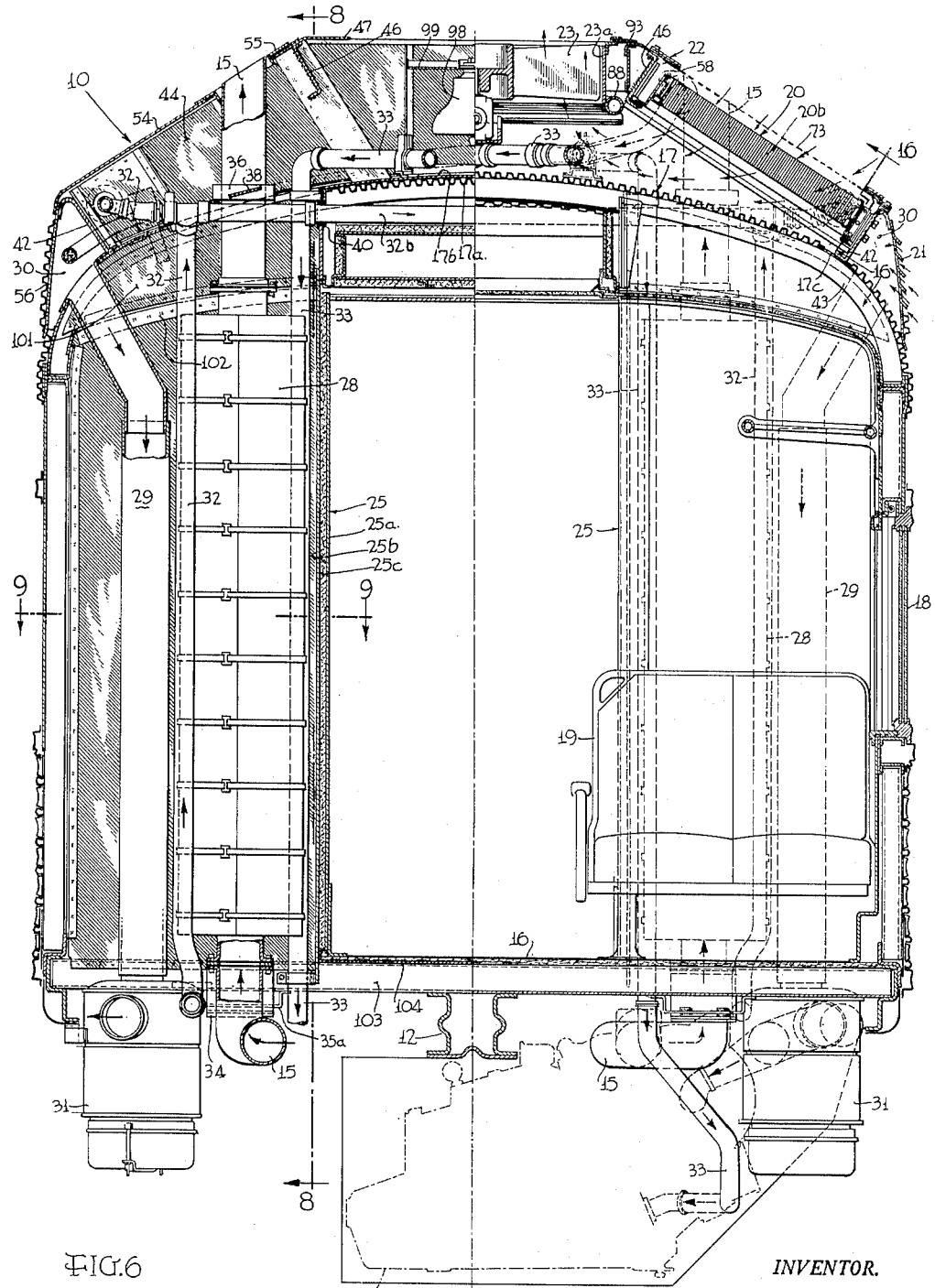

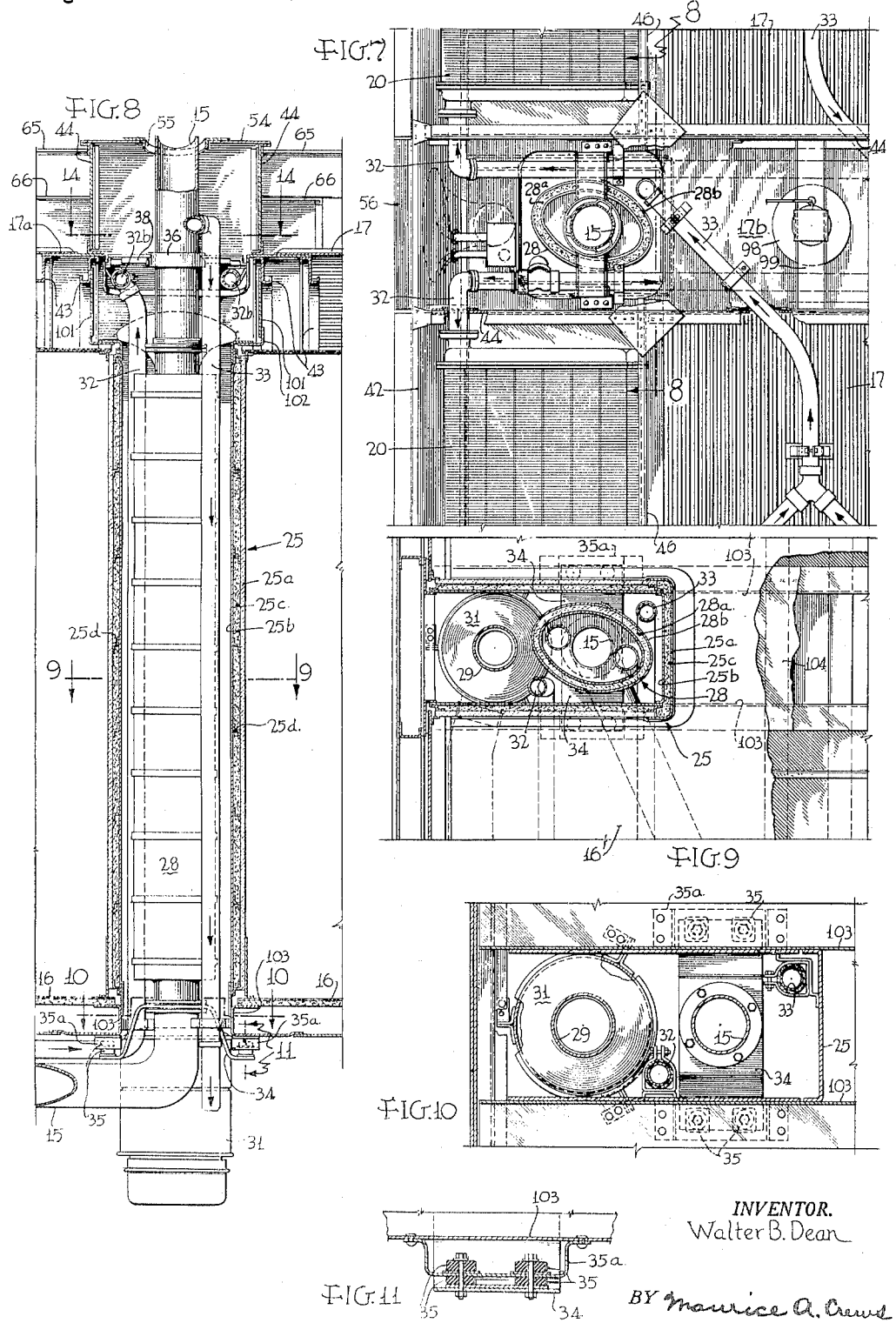

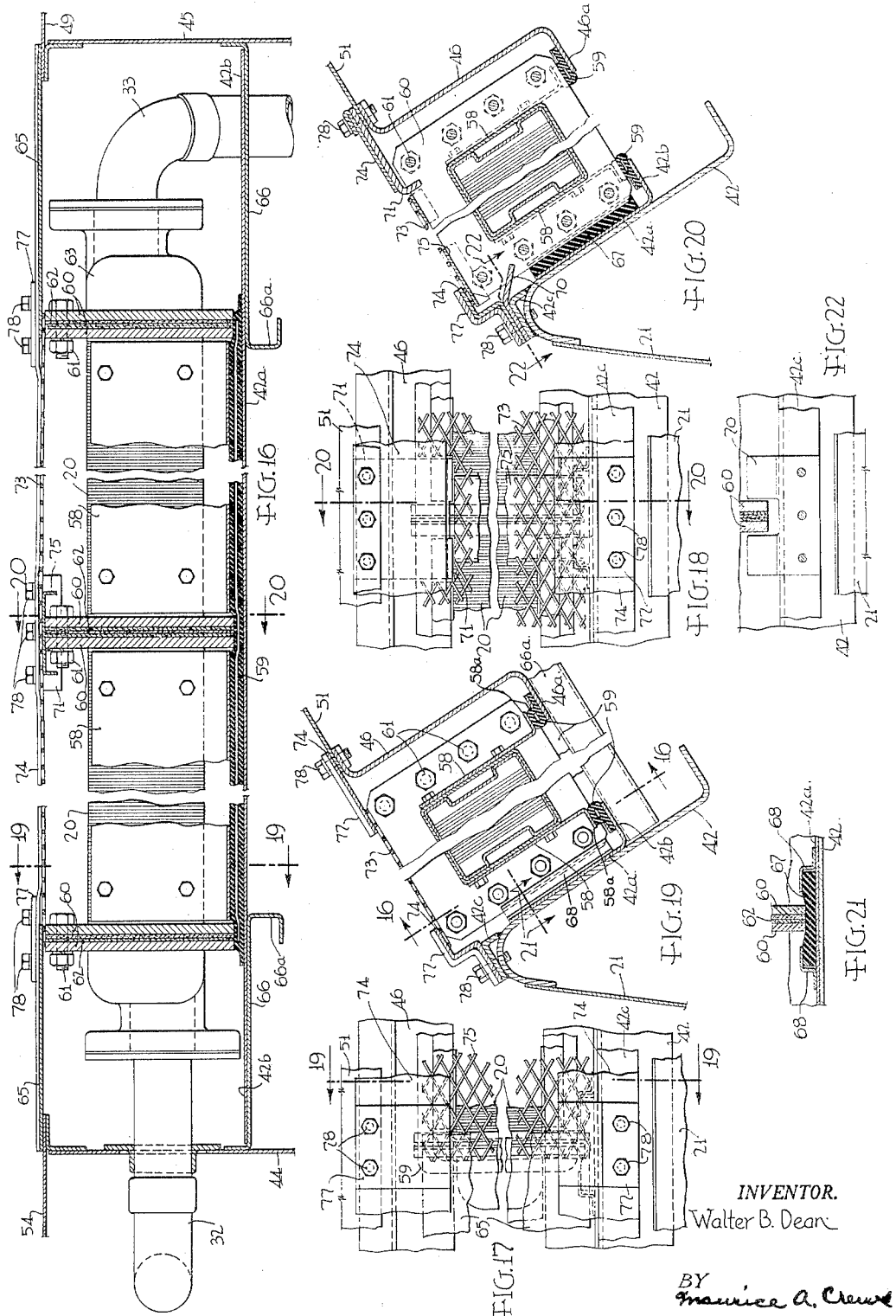

United States Patent Office 2,719,489
Patented Oct. 4, 1955

2,719,489

ROOF AND RELATED STRUCTURAL ARRANGE-
MENTS OF VEHICLES

Walter B. Dean, Narberth, Pa., assignor to The Budd
Company, Philadelphia, Pa., a corporation of Pennsylvania Original application March 30, 1950, Serial No. 152,861,
now Patent No. 2,667,843, dated February 2, 1954.
Divided and this application October 21, 1952, Serial
No. 315,915

6 Claims. (Cl. 105—62)

This invention relates to roof and related structural arrangements for self-propelled vehicles, especially to vehicles having a traction power plant located beneath the floor, certain accessories located above the roof, and certain connecting lines and accessories located between the upper and lower equipment, and has for an object the provision of improvements in this art.

This application is a division of application Serial No. 152,861, filed March 30, 1950, which has matured into Patent No. 2,667,843 on February 2, 1954. The parent application is now directed to the general arrangement of the organization, and the present application is directed to structural features, especially in the roof dome region.

In the vehicle embodying the present invention vertical service ducts are provided on each side of the center aisle of a vehicle housing service lines between upper and lower units.

Cooling, air-supply and exhaust facilities are provided at the roof for an engine located beneath the floor of a vehicle.

The air-supply and fluid cooling facilities are so arranged that they do not unduly mar the roof appearance, on the contrary presenting an ornamental appearance, and will not protrude unduly into the clearance space of the right-of-way along which the vehicle travels.

The vertical service ducts through the vehicle are so arranged that they will be thoroughly swept through by fresh air at all times, especially while the vehicle is traveling.

One of the particular objects is to provide a roof dome structure which is capable of supporting the accessories provided on the roof; which requires the minimum alteration of the main roof; and which amply compensates for the loss of strength in the main roof required to provide for the duct cut-outs and other alterations needed to accommodate the roof accessories.

The above and other objects and advantages of the invention will be apparent from the following description of an exemplary embodiment, reference being made to the accompanying drawings, in which:

Fig. 1 is a side elevation of a rail car embodying the present invention;

Fig. 2 is a horizontal section and plan taken above the car floor;

Fig. 3 is an enlarged top plan view of the domed intermediate part of the car, the radiator covering being removed at the left side and the motor cover being removed at the right side;

Fig. 4 is a reduced plan view of the same intermediate part of the car with the dome removed;

Fig. 5 is a longitudinal vertical section taken on the line 5—5 of Fig. 3;

Fig. 6 is an enlarged transverse vertical section taken on the line 6—6 of Fig. 3;

Fig. 7 is an enlarged plan view of a portion of Fig. 3 in the area or zone "7," parts being broken away to reveal other parts therebelow;

Fig. 8 is a partial longitudinal vertical section taken on the line 8—8 of Figs. 6 and 7;

Fig. 9 is a horizontal section taken on the line 9—9 of Fig. 8;

Fig. 10 is an enlarged horizontal section taken on the line 10—10 of Fig. 8;

Fig. 11 is an enlarged vertical section of a lower exhaust pipe mounting detail taken on the line 11—11 of Fig. 8;

Fig. 12 is an enlarged vertical section of a fan mounting detail taken on the line 12—12 of Fig. 3;

Fig. 13 is an enlarged vertical section of the same detail taken on the line 13—13 of Fig. 3;

Fig. 14 is an enlarged horizontal section of an upper exhaust pipe mounting detail taken on the line 14—14 of Fig. 8, the section line also being shown on Fig. 15, some adjacent parts being omitted for clarity;

Fig. 15 is a vertical section taken on the line 15—15 of Fig. 14;

Fig. 16 is an enlarged shortened longitudinal and generally vertical section taken on the line 16—16 of Figs. 3 and 6, the section also being shown on Fig. 19;

Fig. 17 is an enlarged shortened partial plan view of a portion of Fig. 3 in the area "17";

Fig. 18 is an enlarged shortened plan view of a portion of Fig. 3 in the area "18";

Fig. 19 is a shortened transverse vertical section taken on the line 19—19 of Fig. 17;

Fig. 20 is a shortened transverse vertical section taken on the line 20—20 of Fig. 18;

Fig. 21 is a section taken on the line 21—21 of Fig. 19, showing a detail; and

Fig. 22 is a section taken on the line 22—22 of Fig. 20, showing a detail.

Referring first to Figs. 1, 2, and 6, there is shown a vehicle 10, in the present case a railway passenger car, provided with two traction engines 11 mounted on suitable supports beneath the floor, one on each side of the center sill 12. Each engine, specifically the transmission thereof, is provided with a shaft 13 connected in driving relationship with one of the wheel axles of one of the trucks 14, suitable universal and slide joints being provided to allow all necessary movements between engine and truck during operation. The car includes a floor 16, a corrugated roof 17, windows 18, and seats 19.

The engine is preferably of the Diesel type and produces objectionable exhaust which should be disposed of in such manner as to avoid injury or annoyance to passengers. Here an exhaust stack 15 discharges the gases above the roof of the car.

The engine produces considerable heat and the space beneath the car is so restricted and obstructed that cooling radiators 20 are provided on the roof for cooling the jacket water of the engine and its transmission, the transmission here being of the torque-converter type similar to that known in the automobile field as "Dynaflow."

The engine also requires fresh air for combustion and this should be as clean as possible, hence is taken in at the sides of the roof by intake pipes 29 through louvered openings in side sheets or panels 21 of a shroud casing 22 secured on the roof around the radiators 20.

The radiators are sufficiently exposed on the roof to be quite well cooled by car travel, particularly in cool weather, but in order to assure efficient cooling at other times (see also Fig. 3), the radiators are provided with fans 23 adapted to draw air through openings in the shroud casing 22, then through the radiators, and force it upward away from the roof. The fans are arranged near the upper ends of the exhaust stacks 15 where they will create a low pressure zone to entrain exhaust gases and then force them upward also.

The exhaust, the air intake, the radiators, the motors 24 for the fans, and the controls for the motors and radiators require a number of lines of pipe or wiring between the upper and lower parts of the car; furthermore, it is desired that these lines be as short and direct as possible. Hence on each side of the car and near the mid-length thereof there are provided vertical ducts 25 which extend through the floor, and through the interior space and roof. The ducts are open from end to end at all times, the upper end having a top covering and side openings, and air circulates freely therethrough by chimney action due to hot parts therein, by train movement, by the creation of low pressure zones due to the action of the roof fans, or combinations of these influences. The duct on each side of the center sill serves the engine on that side so that it is not necessary for any of the lines to cross the center sill.

The mid-length and opposed side location of the ducts is also convenient as an interior arrangement since it divides the car longitudinally, as for different uses, such as passengers, baggage, express, mail, etc., and leaves the aisle 26 free for traffic through the train. A door may readily be installed across the aisle between the duct-partitions if wanted. The duct shells also provide additional rigidity and strength for the car at the center and this is especially useful in taking the added load and vibration of the roof equipment. The central or near-central location of the roof shroud casing also presents a balanced ornamental appearance to the car.

The engines are shown to have another but smaller drive shaft at the other end, one engine, the left in Figs. 1 and 2, driving a generator 27a and the other driving a generator and also a compressor 27b.

Within each duct there is located a portion of the length of the exhaust pipe line 15 leading from the engine to the exhaust stack on the roof, an exhaust muffler 28 also being located within the duct. A portion of the air intake pipe line 29 leading from the air intake box 30 on the side of the roof to the engine extends through the duct, an air filter 31 being located just below the lower end of the duct where it is accessible for changing or cleaning. In Fig. 6 it may be observed that the air cleaner also serves as a pipe elbow. Portions of coolant fluid pipe lines 32 (upflow) and 33 (downflow) extending between the roof radiator and the power plant beneath the car are disposed in the duct. In addition there are other lines in the ducts, such as wiring and conduits for controls, and the like, which are not illustrated in detail.

In order to minimize the passage of heat and noise from the inside of the ducts to the passenger space outside, the duct enclosures (Figs. 6, 7, and 8) are made with double spaced walls 25a, 25b, preferably of metal, filled with heat-insulating and sound-proofing material 25c. Instead of metal, a heavy non-metallic board material may be used for the outer part of the transverse walls to further reduce the outward passage of heat and the feeling of a hot surface. A number of stiffeners 25d are provided between walls on at least the transverse walls. The stiffeners may be attached in alternation to opposite wall elements or they may each be connected to both wall elements. In the first case, especially if a small space is left at the unattached side of the stiffeners, the sound-deadening effect is improved and if attached to both elements the strength is improved. Also the muffler 28 is deeply covered with a layer 28a of heat-insulating material, this being covered with a weather-resistant metal jacket 28b as of stainless steel. Further to reduce noise and vibration, the exhaust stack or pipe 15 (Figs. 8 and 11) is provided at the lower end with a resilient bracket 34 mounted on resilient supports 35, as of rubber, carried by stirrups 35a and is resiliently supported near its upper end (Figs. 8, 14, and 15) by a ring 36 having a spring spider 37 connected to the stack and to resilient arms 38 secured to a fixed anchorage on the roof. The muffler partly closes the duct space and prevents tube resonance in the duct from the staccato ejections from the upper end of the exhaust pipe which is located at the upper end of the duct.

The radiation means 20 for each engine is formed in two parts 20a, 20b, one on each side of the center of the roof, and the coolant supply pipe 32 and return pipe 33 branch above the roof to serve the separate radiators. The fan 23 for each pair of radiators for an engine is located between them.

As shown in Fig. 3, the water upflow pipes 32 divide at the upper end of the duct, one branch 32a going to a radiator on one side and a longer branch 32b going to the radiator on the other side. The upflow pipes extend to the inner or adjacent ends of the radiators with reference to a transverse line and to the lower outer sides with reference to the longitudinal center line of the car. As shown in Fig. 6, the longer branch or cross-over pipes 32b pass directly across the space between ducts and also pass below the intermediate corrugated part 17a of the main roof, which here has the corrugations disposed below a smooth heavy cover plate 17b. The spaces around the pipes are sealed, as at 40 (Fig. 6), where they pass through the inner side walls of the ducts 25.

Also, as shown in Fig. 3, the water downflow pipes 33 divide above the roof near the fans 23 and extend rather symmetrically in branches 33a, 33b to the outer or distant ends of the radiators with reference to a transverse line and to the upper inner edges with reference to the longitudinal center line of the car. The position of these branch lines above the main roof is apparent in Fig. 6.

The reason for this arrangement of water pipes is to have all sections of pipe slope back toward the bottom of the car so they will quickly drain. They form part of a cooling system in which coolant is supplied to the roof radiators only when this additional cooling is required. At all other times the radiators and pipes connected therewith drain back to the heating system within the car, the system for one engine being separate from that for the other, and then to a tank below the floor of the car.

The shroud 22 includes two strong Z-shaped longitudinal structural frame strength members 42, one on each side of the roof, and these members 42 extend for almost the full length of the dome to separate the intake air box 30 from the radiator compartment. The members 42 in their bottom flanges are attached, as by welding, to smooth roof sheets 17c which are attached, in turn, to the roof carlines 43, as by welding. The smooth sheets 17c (Fig. 6) are disposed between corrugated roof sheets on either side thereof. Near their midlength the longitudinal members 42 have secured to them, as by welding, spaced intermediate transverse structural frame strength members 44. The lower edges of the members 44 are secured to the roof, specifically to the smooth roof sheet 17b, as by welding. Near their outer ends the longitudinal frame members 42 have secured to them, as by welding, end transverse structural frame strength members 45. The lower edges of the frame members 45 are secured, as by welding, to the corrugated roof sheets.

Intermediate the side longitudinal members 42 and secured to the transverse members 44 and 45, there are disposed near the top of the dome narrow Z-shaped longitudinal structural frame strength members 46. Above the eight joints where the frame members 44, 45, and 46 intersect there are secured, as by welding, joint cover plates 47. Beyond the ends of the frame members 46 and in general extension thereof, there are provided short tapered longitudinal frame members 48 which are secured to the end transverse frame members 45 and to the roof, as by welding.

To the members 48 and to the roof and transverse members 45 there are secured on each side, as by welding, smooth end cover plates 49 which taper down to the roof and form the end sheets of the dome. In the center, at each end, a removable cover 49a encloses a motor 24. On the right end of Fig. 3 the cover 49a is removed but is left on at the left end. A raised removable cap 49b covers the outer end of the motor. It may be readily removed for inspection.

Between the transverse members 44 and 45 in the longitudinal direction and between the adjacent longitudinals 46 in the transverse direction, there is arranged at each end a cover plate 51, each cover plate being provided with an opening to receive a fan shroud 23a and being rigidified around the opening by a frame ring 52. The parts are suitably secured together, as by welding, to maintain their fixed positions.

Between the adjacent intermediate transverse members 44 on the one hand and between the longitudinals 42 and 46 on the other hand, there are secured side intermediate duct cover sheets 54, the sheets being suitably apertured and reinforced, as by fittings 55, to accommodate the ends of the exhaust pipes 15.

Outside the cover sheets 54 (Fig. 6), the air intake boxes 30 are covered by side cover sheets 56 comprising a smooth plate covered by a corrugated sheet. Air is drawn in at each end of the air box 30 but the center is covered against entry of air, rain, and snow.

From the above description and illustration, it may be seen that the side longitudinal members 42 seal against the roof at the smooth sheets 17c, that the transverse members 44 seal against the roof at the smooth sheets 17b, and that the fan sheets 51 seal the space around the fan shroud. The end transverse members 45 are also sealed against the roof, either by fitting to the corrugations of the roof or by filling them beneath the members 45, except that the lowest corrugation on each side may be left open to allow water to drain off. The ducts are thus roofed but have side outlets to the center to permit a draft therethrough. The outer spaces around the radiators are also sealed to provide a closed path for air from above the radiators through them and to the fan, as indicated by arrows in Fig. 6.

The radiators themselves are provided with mounting shrouds 58 which are sealed to adjacent parts to force air to pass through the finned openings of the radiators. As shown in Fig. 19, the radiator shroud 58 is provided with out-turned flanges 58a which overlie flanges 46a of the longitudinal member 46 and the flange 42b of an angle piece 42a secured to the longitudinal member 42, sealing strips 59, as of rubber, being interposed between adjacent flanges.

As shown particularly in Fig. 16, the radiators are made in sections each with end plates 60 which are bolted together, as by bolts 61, with sealing sheets 62 between plates. Headers 63 are likewise provided with plates 60. The end plates 60 comprise part of the radiator shrouding and, as shown in Fig. 16, the plates at the ends of the radiator are closely embraced by a cover plate 65 and a bottom plate 66, the latter being flanged, as at 66a, for rigidity. The radiators are cushioned at their end plates, Figs. 19, 20, 21, as by pads 67 of rubber or the like. Flanges 68 welded to the angle pieces 42a retain the pads 67 in proper position. The sealing strips 59 extend across the ends of the radiator between the end plates 60 and the flanged ends of the end-supporting sheets 66. The radiator is thus completely sealed around the bottom edges and the space below is substantially sealed, whereby to cause the fans to draw practically all of their air down through the radiator cores.

The radiators may be held against longitudinal movement in the middle by a notched plate 70 at the lower edge and by another notched plate 71 at the upper edge (Figs. 13 and 20). These plates embrace the radiator end plates 60 as assembled together. The ends of the radiators may expand in each direction away from the center. The upper edges of the longitudinal members 42 are provided with angle plates 42c (Figs. 19 and 20), the same being shown to be arc-welded to the curved upper edge, to provide a flat seat for the parts assembled thereover, including the notched plates 70.

A protective screen 73 is secured over the radiators, the same being rigidified at the ends by the plates 65, at the sides by sheets 74, and at the middle by a saddle channel sheet 75 which straddles the center assemblage of radiator end plates 60. These various rigidifying parts may be made a unit with the screen 73, as by welding, if desired. The screen assembly is secured in position and the radiators are anchored down by clamp plates 77 secured by bolts 78 at each assemblage of end plates 66 except at the top center (Fig. 20) where the positioning plate 71 also serves as a clamp plate. The sheets 74 may be jogged to fit around the short plates 70, 71, or, if not, the spaces may be filled in any suitable manner, as by metal fillers or compound. Or the plates 70, 71 may be omitted to provide a smooth assembly, inasmuch as the clamp plates 77 will hold the radiators very securely, anyway. If air leaks in here it is not too serious because it must pass down through the radiator core anyway.

In Fig. 4 the frame of the dome is shown with the covers and related apparatus removed. Here the longitudinal members 42, 46, and 48 appear and also the transverse members 44 and 45. The main corrugated roof 17 is shown running through to the ducts and smooth center roof section 17a. Also there appear plates 49c which are welded to the tops of the main roof corrugations for the securement of the dome end covers 49, 49a. Here, as under the transverse members 45, the corrugations are filled, as with cork composition or the like, except at the outer lower edges where drainage is desired.

The fans and their associated parts are shown principally in Figs. 3, 4, 5, 12, and 13. Here the motor 24 is seen to be mounted on a base 80 which is secured on cross members 81 which are anchored at their ends to the longitudinal frame members 48. The motor shaft 82 passes to a gear box 83 disposed below and carrying the fan 23, one or more flexible couplings 84 being provided in the shaft to accommodate lateral and longitudinal movements.

The gear box 83 is carried on a base 86 which is provided with transverse bars 87 which are secured, as by arc-welding, to the ring 88 which forms part of the fan shroud 23a. One of the bars is bent down in the middle to pass under the shaft 82 and the gear box.

The fan shroud 23a is resiliently supported on the annular frame 52 of the cover 51. As shown in Fig. 12, the shroud 23a is provided with an annular flange 90 which rests on resilient members 91, as of rubber, which are carried on feet 92 secured to the frame 52. The space between the shroud and the frame is sealed, as by an annular flat strip of resilient flexible material 93, preferably of rubber. The strip 93 is held in place, Fig. 13, by an annular metal strip 94 welded to the top flange piece 90 of the fan shroud 23a. The resilient members 91 are each held in place by a stem at the upper end which is secured to the flange piece 90, as by a nut.

A bell 98 is carried by a cross plate 99 secured to the transverse frame members 44. Preferably it is resiliently mounted to avoid transmitting thumping sounds to the interior passenger space. The space around the bell is left open above the main roof section 17a, both to keep a draft in the ducts and to allow the bell to be heard.

The various sheets and covers may be rigidified, as by ribs welded thereto, but these are largely omitted in the drawings for clarity. The strengthening ribs for the structural members 48 are shown, however, where they support the motor.

It is thus seen that the invention provides ducts and shrouding which will effectively serve the motors, specifically which provide for proper disposal of exhaust gases, proper supply of air, and proper cooling of engine coolant fluid. The parts are associated and interrelated in such manner that the provisions for one assist in the functioning of the provisions of the others. The fresh air is taken in at the sides and over a considerable length so that it will not be contaminated with exhaust gases and so that rapid inflow at any given point is avoided whereby to minimize the inflow of rain or snow. The blower fans for cooling the radiators assist in the disposal of exhaust gases and also assist in drawing air up through the ducts to cool parts disposed therein.

It may also be noted from Fig. 6 that the variable spacing between the radiator and the car roof, increasing from the outside toward the inside, provides for equalizing as far as possible the velocity of flow of air through the radiator to the fan, the smallest space existing at the outer edge and the greatest space existing at the inner edge near the fan. In this way the cooling effect over the whole radiator is approximately equalized.

The provision of the central ducts on the sides tends to weaken the floor and roof, and to compensate for the holes through floor and roof the structure is correspondingly strengthened. In the roof (Figs. 5 and 8) supplemental roof carlines 43 are added where one had to be omitted. These supplemental carlines are located directly below the transverse members or beams 44. It may be seen in Fig. 5 that the cross members or beams 45 are also located directly above carlines 43. The longitudinal beams 42 find full support on a number of transverse carlines, and the longitudinal beams 42, 46 carry the roof sheet stresses across the central portion of the car as efficiently as if no aperture had been made.

Proceeding downward in Figs. 6 and 8, it will be seen that the rigid transverse walls 25 of the ducts, more specifically the inner sheet 25b of metal, substantially underlie the jumper carlines 43 and beams 44, plates 101 and angles 102 intervening and the parts being secured together, so that the duct walls tend further to strengthen and rigidify the roof at the duct apertures.

Where the floor is apertured (Figs. 6, 8, and 9), heavy transverse floor beams 103 are run across at the sides of the openings, and these are connected between ducts by a heavy sheet 104 welded to the tops of beams 103. The duct side sheets 25b are secured, as by welding, to the cross beams 103, thus taking the roof load right down into the reinforced floor. The side walls of the car are substantially unaffected by the ducts and related construction and the dome load is largely carried in a fairly short direct path into the side walls.

While one embodiment of the invention has been described, it is to be understood that there may be various embodiments within the scope of the invention.

What is claimed is:

1. In a vehicle having a floor and floor frame, sides and side frames, ends and end frames, a main roof and roof frame taking loads longitudinally of the vehicle, and means providing transversely spaced-apart ducts intermediate the length of the vehicle extending through the floor and main roof, the combination of auxiliary main roof means connecting the end portions of the main roof together at main roof level between the ducts, and a dome structure comprising raised roof portions spanning the intermediate zone at the ducts and extending endwise of the vehicle beyond the duct zone for a considerable distance, said dome structure including longitudinal beams on each side of each duct and transverse beams at each end of the ducts and connected to the longitudinal beams, the framework formed by said beams being secured to the main roof.

2. In a vehicle having a floor and floor frame, sides and side frames, ends and end frames, a main roof and roof frame taking loads longitudinally of the vehicle, and means providing transversely spaced-apart ducts intermediate the length of the vehicle extending through the floor and main roof, the combination of auxiliary main roof means connecting the end portions of the main roof together at main roof level between the ducts, and a dome structure comprising raised roof portions spanning the intermediate zone at the ducts and extending endwise of the vehicle beyond the duct zone for a considerable distance, said dome structure including longitudinal beams on each side of each duct and transverse beams at each end of the ducts and connected to the longitudinal beams, the framework formed by said beams being secured to the main roof, there being a plurality of spaced transverse beams at each end of the ducts, one closely alongside the ducts and one at a considerable distance therefrom, and the dome roof being inclined from the endmost transverse beams down to the main roof.

3. In a vehicle having a floor and floor frame, sides and side frames, ends and end frames, a main roof and roof frame taking loads longitudinally of the vehicle, and means providing transversely spaced-apart ducts intermediate the length of the vehicle extending through the floor and main roof, the combination of auxiliary main roof means connecting the end portions of the main roof together at main roof level between the ducts, and a dome structure comprising raised roof portions spanning the intermediate zone at the ducts and extending endwise of the vehicle beyond the duct zone for a considerable distance, said dome structure including longitudinal beams on each side of each duct and transverse beams at each end of the ducts and connected to the longitudinal beams the framework formed by said beams being secured to the main roof, there being a plurality of spaced transverse beams at each end of the ducts, one closely alongside the ducts and one at a considerable distance therefrom, and the dome roof being inclined from the endmost transverse beams down to the main roof, the main roof frame including transverse carlines, the transverse dome frame members being disposed directly above main roof carlines and being secured thereto through the main roof.

4. In a vehicle having a floor and floor frame, sides and side frames, ends and end frames, a main roof and roof frame taking loads longitudinally of the vehicle, and means providing transversely spaced-apart ducts intermediate the length of the vehicle extending through the floor and main roof, the combination of auxiliary main roof means connecting the end portions of the main roof together at main roof level between the ducts, and a dome structure comprising raised roof portions spanning the intermediate zone at the ducts and extending endwise of the vehicle beyond the duct zone for a considerable distance, said dome structure including longitudinal beams on each side of each duct and transverse beams at each end of the ducts and connected to the longitudinal beams, the framework formed by said beams being secured to the main roof, the outermost of said longitudinal beams at their bottom edges being spaced inwardly from the planes of the sidewalls of the vehicle and providing end space for pipes extending down through said ducts.

5. In a vehicle having a floor and floor frame, sides and side frames, ends and end frames, a main roof and roof frame taking loads longitudinally of the vehicle, and means providing transversely spaced-apart ducts intermediate the length of the vehicle extending through the floor and main roof, the combination of auxiliary main roof means connecting the end portions of the main roof together at main roof level between the ducts, and a dome structure comprising raised roof portions spanning the intermediate zone at the ducts and extending endwise of the vehicle beyond the duct zone for a considerable distance, said dome structure including longitudinal beams on each side of each duct and transverse beams at each end of the ducts and connected to the longitudinal beams, the framework formed by said beams being secured to the main roof, the innermost of said longitudinal beams having their upper edges at a higher elevation than the top edges of the outermost longitudinal beams to provide an outwardly and downwardly inclined support for equipment and the dome roof.

6. In a vehicle having a floor and floor frame, sides and side frames, ends and end frames, a main roof and roof frame taking loads longitudinally of the vehicle, and means providing transversely spaced-apart ducts intermediate the length of the vehicle extending through the floor and main roof, the combination of auxiliary main roof means connecting the end portions of the main roof together at main roof level between the ducts, and a dome structure comprising raised roof portions spanning the intermediate zone at the ducts and extending endwise of the vehicle beyond the duct zone for a considerable distance, said dome structure including longitudinal beams on each side of each duct and transverse beams at each end of the ducts and connected to the longitudinal beams, the framework formed by said beams being secured to the main roof, the innermost of said longitudinal beams having their upper edges at a higher elevation than the top edges of the outermost longitudinal beams to provide an outwardly and downwardly inclined support for equipment and the dome roof, said innermost longitudinal beams also having their lower edges spaced above the main roof level between the transverse beams to provide clear space for service lines and air flow.

References Cited in the file of this patent

UNITED STATES PATENTS

| | | |
|---|---|---|
| 867,701 | Burns | Oct. 8, 1907 |
| 1,189,341 | Batchelder | July 4, 1916 |
| 1,752,230 | Burkhardt | Mar. 25, 1930 |
| 1,776,479 | Rayburn | Sept. 23, 1930 |
| 1,941,885 | Faverty | Jan. 2, 1934 |

FOREIGN PATENTS

| | | |
|---|---|---|
| 315,544 | Great Britain | July 18, 1929 |